(12) United States Patent
Liu et al.

(10) Patent No.: US 12,007,024 B2
(45) Date of Patent: Jun. 11, 2024

(54) LUBRICATING MECHANISM OF PIN CONNECTION PAIR OF INTERNAL COMBUSTION ENGINE

(71) Applicants: MAHLE Automotive Technologies (China) Co., Ltd., Shanghai (CN); Mahle International GmbH, Stuttgart (DE)

(72) Inventors: Junzhuo Liu, Shanghai (CN); Shaobo Zeng, Shanghai (CN)

(73) Assignees: MAHLE AUTOMOTIVE TECHNOLOGIES (CHINA) CO., LTD. (CN); MAHLE INTERNATIONAL GMBH (DE)

( * ) Notice: Subject to any disclaimer, the term of this patent is extended or adjusted under 35 U.S.C. 154(b) by 165 days.

(21) Appl. No.: 17/481,303

(22) Filed: Sep. 21, 2021

(65) Prior Publication Data

US 2022/0112952 A1  Apr. 14, 2022

(30) Foreign Application Priority Data

Sep. 22, 2020 (CN) .......................... 202011002793.2

(51) Int. Cl.
*F16J 1/08* (2006.01)
*F02F 3/22* (2006.01)
*F16J 1/16* (2006.01)

(52) U.S. Cl.
CPC .................. *F16J 1/08* (2013.01); *F02F 3/22* (2013.01); *F16J 1/16* (2013.01)

(58) Field of Classification Search
CPC .......... F16J 1/08; F16J 1/09; F16J 1/16; F02F 3/00; F02F 3/22; F01M 1/08; F01M 9/00;
(Continued)

(56) References Cited

U.S. PATENT DOCUMENTS

| 5,072,654 | A | 12/1991 | MacGregor |
| 7,281,466 | B1 * | 10/2007 | Wilksch ................... F02F 3/22 92/186 |

(Continued)

FOREIGN PATENT DOCUMENTS

| CN | 102330584 A | 1/2012 |
| CN | 203420794 U | 2/2014 |

(Continued)

OTHER PUBLICATIONS

Machine translation, DE102016218171 A1, Mancho et al., published Mar. 22, 2018, obtained from https://worldwide.espacenet.com/, pp. 1-16.*

(Continued)

*Primary Examiner* — Grant Moubry
(74) *Attorney, Agent, or Firm* — Fishman Stewart PLLC

(57) ABSTRACT

A lubricating mechanism of a pin connection pair of an internal combustion engine having a piston, a pin, and a connecting rod. The pin may be mounted in two pin seat portions of the piston such that the pin and one of the two pin seat portions form the pin connection pair. The lubricating mechanism may include a lubricating passage through which a lubricating medium is flowable and an oil outlet orifice communicating with the lubricating passage. The lubricating passage and the oil outlet orifice may be disposed in a piston top portion of the piston. An opening of the oil outlet orifice may face in an axial direction and may be disposed directly below a corresponding portion of the lubricating passage such that the lubricating medium is flowable via the opening directly to a gap defined between the connecting rod and a pin seat portion.

19 Claims, 3 Drawing Sheets

(58) Field of Classification Search
CPC ........ F01M 2001/086; F01P 3/06; F01P 3/10; F01P 3/12
See application file for complete search history.

(56) References Cited

U.S. PATENT DOCUMENTS

| | | | |
|---|---|---|---|
| 7,900,551 | B2 | 3/2011 | Benz et al. |
| 2003/0051694 | A1 | 3/2003 | Gaiser |
| 2005/0211089 | A1 | 9/2005 | Doers |
| 2008/0250922 | A1 | 10/2008 | Hayes |
| 2009/0007776 | A1 | 1/2009 | Benz |
| 2010/0107999 | A1 | 5/2010 | Scharp |
| 2011/0185889 | A1 | 8/2011 | Muscas |
| 2011/0185992 | A1* | 8/2011 | Gniesmer ............... B23P 15/10 123/41.39 |
| 2011/0203547 | A1 | 8/2011 | Gildemeister et al. |
| 2016/0061253 | A1 | 3/2016 | Yoshida |
| 2018/0038265 | A1 | 2/2018 | Schmidt |
| 2019/0145345 | A1* | 5/2019 | Azevedo ............... F16J 1/08 123/41.38 |
| 2022/0112952 | A1* | 4/2022 | Liu ............... F02F 3/22 |

FOREIGN PATENT DOCUMENTS

| | | |
|---|---|---|
| CN | 203670021 U | 6/2014 |
| CN | 105386811 A | 3/2016 |
| CN | 205089470 U | 3/2016 |
| CN | 210033648 U | 2/2020 |
| CN | 111622856 A | 9/2020 |
| CN | 111622857 A | 9/2020 |
| DE | 1905609 A1 | 8/1970 |
| DE | 19647735 C1 | 2/1998 |
| DE | 10230746 A1 | 1/2004 |
| DE | 102005061059 A1 | 6/2007 |
| DE | 102016218171 A1 * | 3/2018 ............... F01M 1/06 |
| DE | 102016218171 A1 | 3/2018 |
| DE | 102017130691 A1 * | 6/2019 ............... F01M 1/06 |
| GB | 586746 A | 3/1947 |
| JP | H06229217 A | 8/1994 |
| JP | H08296420 A | 11/1996 |
| JP | H09195847 A | 7/1997 |
| JP | H11182334 A | 7/1999 |
| JP | 2004225597 A | 8/2004 |
| JP | 2006214296 A | 8/2006 |
| JP | 2009041680 A | 2/2009 |
| JP | 2014125951 A | 7/2014 |
| JP | 2017166568 A | 9/2017 |
| JP | 2019007578 A | 1/2019 |
| WO | 06027157 A1 | 3/2006 |
| WO | 2011087563 A1 | 7/2011 |

OTHER PUBLICATIONS

German Search report dated Feb. 28, 2022 for copending German Patent App. No. DE102021210418.5.
English abstract for CN-203420794.
Chinese Search Report dated Aug. 11, 2022 for copending Chinese App. No. 2020110027932.
Chinese Office Action dated Aug. 17, 2022 for copending Chinese App. No. 202011002793.2 (w_English_translation).

* cited by examiner

LUBRICATING MECHANISM OF PIN CONNECTION PAIR OF INTERNAL COMBUSTION ENGINE

CROSS-REFERENCE TO RELATED APPLICATIONS

This application claims priority to Chinese Patent Application No. CN 202011002793.2, filed on Sep. 22, 2020, the contents of which is hereby incorporated by reference in its entirety.

TECHNICAL FIELD

The present disclosure relates to the field of internal combustion engine, in particular to a lubricating mechanism of a pin connection pair of an internal combustion engine.

BACKGROUND

In order to improve fuel economy and reduce emissions, the manufacturer of internal combustion engine constantly improves the performance of internal combustion engine, which causes the detonation pressure of internal combustion engine increasing (over 20 Mpa). The transmission coupling between the steel piston and the connecting rod need to be established through a pin in this case, so that the steel piston, pin and connecting rod constitute the transmission mechanism of the internal combustion engine, and the pin seat and the pin of the steel piston form a pin connection pair, so that the energy generated by fuel combustion is transmitted to the crankshaft in the form of torque, and the crankshaft rotates and outputs power.

In order to enhance the anti-seizure ability of the above-mentioned pin connection pair during the operation of the internal combustion engine, a solution of using a connecting rod for forced lubrication can be adopted, in which the rod body of the connecting rod is formed with a deep elongated hole, and the lubricating oil at the large end of the connecting rod is guided to the small end of the connecting rod, which can lubricate not only the connecting portion between the pin and the connecting rod but also the pin connection pair; or a solution of using a pin with a DLC (Diamond-like Carbon Film) coating can be adopted, in which the DLC coating is applied on the surface of the pin to reduce the friction of the pin connection pair. Although the above solutions can improve the anti-seizure ability of the pin connection pair, they are costly with increasing the fabrication cost of large-scale mass production.

In view of the above defects, those skilled in the art have carried out in-depth research into the lubrication technology of pin connection pair. For example, the Chinese utility model patent CN 203420794 U "piston structure for lubricating pin of connecting rod" discloses a related lubrication technology, wherein the piston structure consists of a piston head portion with a cooling oil passage, and an end face of the pin seat of the piston skirt portion near a central side of the piston body is connected to the cooling oil passage via a communication passage penetrating the pin seat. With such technical solution, lubricating oil can be drained to a gap between the connecting rod and the pin along the communication passage, which enhances the lubrication effect for the pin connection pair. Although the above technology can enhance the lubrication effect for the pin connection pair, the structural strength of the pin seat is reduced because the communication passage penetrates the whole pin seat. In addition, due to the long length of the communication passage penetrating the pin seat, there are problems that may lead to poor drainage effect and blockage of the communication passage.

SUMMARY

The present disclosure is implemented in order to overcome or at least alleviate the above drawbacks of the prior art. An object of the present disclosure is to provide a novel lubricating mechanism of a pin connection pair of an internal combustion engine, which, compared with the aforementioned solutions of the prior art, can effectively improve the lubricating effect for the pin connection pair without affecting the structural strength of the pin seat, thereby improving the anti-seizure ability of the pin connection pair.

To achieve the above object, the present disclosure employs the following technical solution.

The present disclosure provides a lubricating mechanism of a pin connection pair of an internal combustion engine, the internal combustion engine comprising a piston, a pin and a connecting rod, the piston being formed in a cylindrical shape and having an axial direction, a radial direction and a circumferential direction, the piston comprising a piston top portion and a piston skirt portion connected to the piston top portion, the piston skirt portion extending from a peripheral portion of the piston top portion toward one side in the axial direction, the piston skirt portion being formed with two pin seat portions matched with both ends of the pin, and the both ends of the pin being mounted in pin holes formed in the two pin seat portions, such that the pin and the pin seat portion form the pin connection pair, and an intermediate portion of the pin between the both ends being connected to the connecting rod, the lubricating mechanism comprises a lubricating passage through which a lubricating medium flows formed inside the piston top portion and an oil outlet orifice communicating with the lubricating passage, wherein the oil outlet orifice is formed in a position of the piston top portion away from the piston skirt portion, and an opening of the oil outlet orifice facing the one side in the axial direction is located directly below a corresponding portion of the lubricating passage, such that the lubricating medium directly flows to a gap between the connecting rod and the pin seat portion via the opening.

Preferably, a longitudinal direction of the oil outlet orifice extends along a direction intersecting with a central axis of the pin hole in a plan view viewed from the one side in the axial direction.

More preferably, in the longitudinal direction, the oil outlet orifices have a tapered shape whose width gradually decreases from one end to the other end.

More preferably, the lubricating passage is formed with a guiding surface for guiding the lubricating medium toward the oil outlet orifice, wherein the guiding surface is connected to the one end of the oil outlet orifice.

More preferably, the guiding surface extends obliquely toward the other side in the axial direction while extending radially outward.

More preferably, the lubricating mechanism comprises two of the oil outlet orifices, and in a direction along the central axis of the pin hole, the two oil outlet orifices are located between the two pin seat portions.

More preferably, one of the two oil outlet orifices faces a gap between the connecting rod and one of the pin seat portions, and the other of the two oil outlet orifices faces a gap between the connecting rod and the other pin seat portion.

More preferably, the lubricating mechanism further comprises an oil inlet orifice communicating with the lubricating passage, wherein the oil inlet orifice opens toward the one side in the axial direction and is formed in a position of the piston top portion away from the piston skirt portion.

More preferably, the oil inlet orifice and the oil outlet orifice are arranged on both sides of the pin seat portion with the pin seat portion therebetween.

More preferably, the lubricating passage continuously extends along the circumferential direction over an entire circumference of the piston top portion, and the lubricating medium also serves as a cooling medium for cooling the piston.

By adopting the above technical solution, the present disclosure provides a novel lubricating mechanism of a pin connection pair of an internal combustion engine. In an internal combustion engine, a piston skirt portion of a piston is formed with two pin seat portions matched with both ends of a pin, and the both ends of the pin are mounted in pin holes of the two pin seat portions, such that the pin and the pin seat portion form a pin connection pair, and an intermediate portion of the pin between the both ends is connected to a connecting rod. Further, the lubricating mechanism according to the present disclosure comprises a lubricating passage formed inside the piston top portion though which a lubricating medium flows, and an oil outlet orifice communicating with the lubricating passage. The oil outlet orifice is formed in a position of the piston top portion away from the piston skirt portion, and the opening of the oil outlet orifice facing one side in the axial direction are located directly below the corresponding portion of the lubricating passage, such that the lubricating medium can directly flow to gaps between the connecting rod and the pin seat portion.

Therefore, without affecting the structural strength of the piston skirt portion (especially the pin seat portion), the lubricating mechanism according to the present disclosure can make the lubricating medium directly flow to the gaps between the connecting rod and the pin seat portion by utilizing the position of the oil outlet orifice without deliberate diversion, which avoids the adverse influence caused by the long communication passage in the prior art, and effectively improves the lubricating effect for the pin connection pair. Thus a large amount of lubricating medium enables to continuously flow through the pin connection pair to lubricate it. In this way, the friction power consumption is reduced by greatly reducing the dry friction or mixed friction state of the pin connection pair. Meanwhile, sufficient lubrication is provided for the pin connection pair, thereby improving the anti-seizure ability of the pin connection pair. In addition, the lubricating mechanism according to the present disclosure is simple in structure and low-cost to manufacture, which facilitates large-scale mass production.

LIST OF THE REFERENCE SIGNS

1 piston top portion, 1h1 oil inlet orifice, 1h2 oil outlet orifice, 1p lubricating passage, is guiding surface, 2 piston skirt portion, 21 pin seat portion, 21h pin hole, O central axis, A axial direction, R radial direction, C circumferential direction

DETAILED DESCRIPTION

Hereinafter, specific embodiments of the present disclosure will be described with reference to the drawings. In the present disclosure, unless otherwise specified, axial direction A, radial direction R and circumferential direction C refer to the axial direction, radial direction and circumferential direction of the piston, respectively; and one side in the axial direction refers to the lower side in FIG. 3, and the other side in the axial direction refers to the upper side in FIG. 3.

Generally, an internal combustion engine can be either a diesel engine or a gasoline engine. An internal combustion engine comprises a cylinder, a piston, a pin and a connecting rod. The piston is accommodated in the cylinder and enables to reciprocate in the cylinder, so that the energy produced after fuel combustion is transmitted to a crankshaft via the pin and the connecting rod in the form of torque to rotate the crankshaft and output power.

Figure 1:
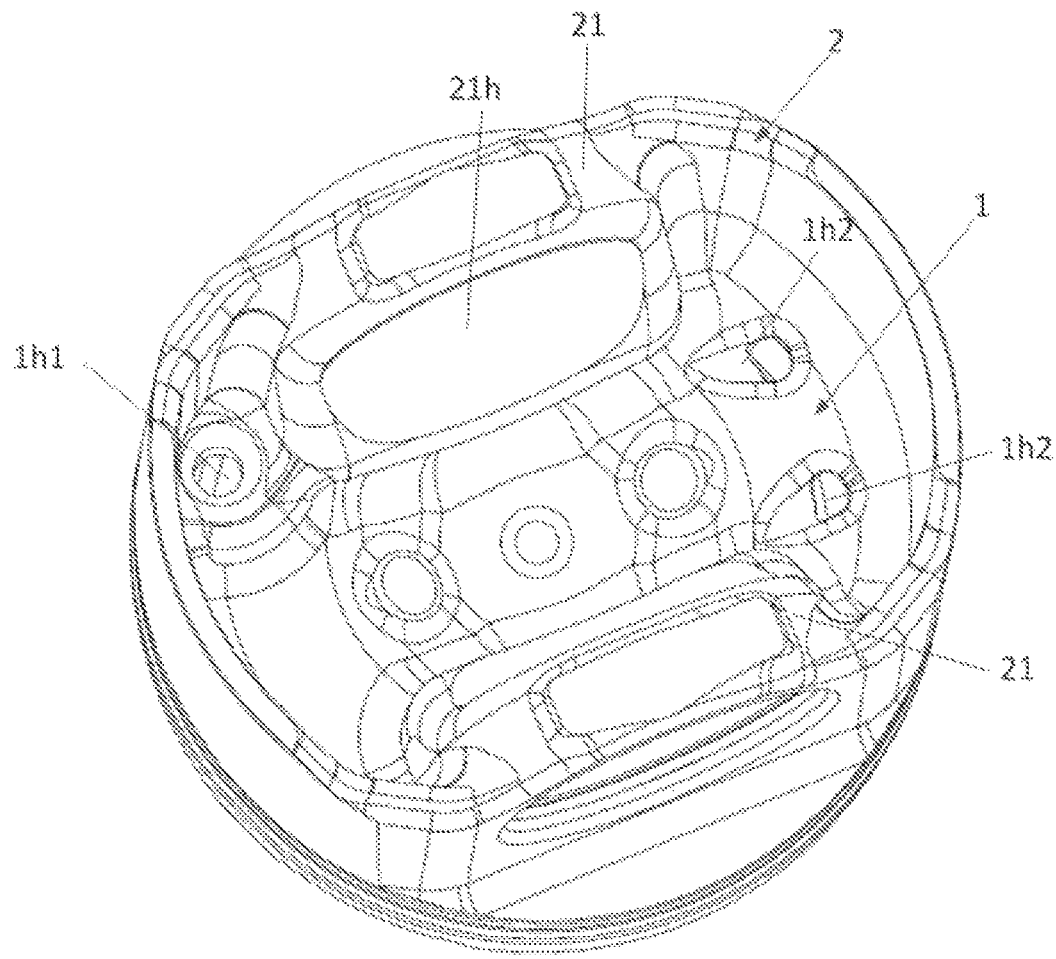
FIG. 1 is a schematic view showing a perspective structure of a piston for an internal combustion engine including a lubricating mechanism according to an embodiment of the present disclosure.
Figure 2:
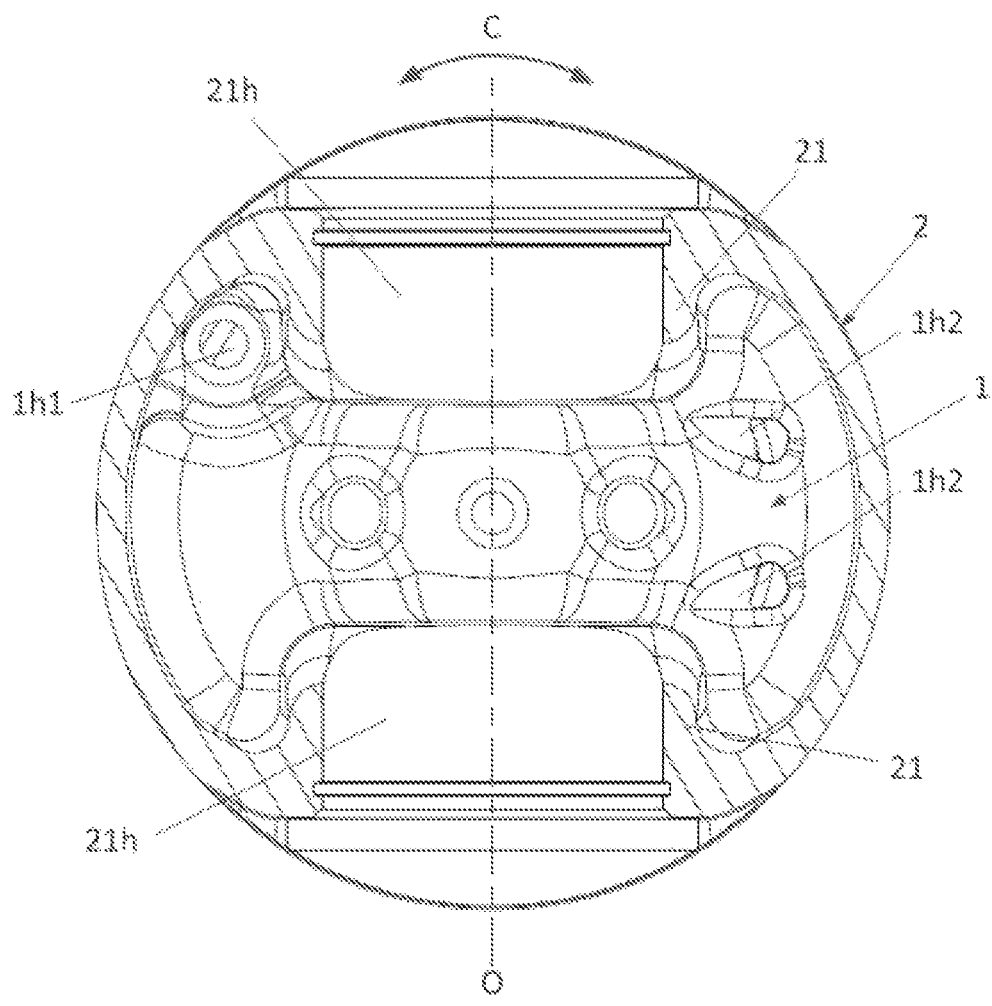
FIG. 2 is a schematic view showing the cross-section of the piston in FIG. 1 when viewed from one side in the axial direction.
Figure 3:
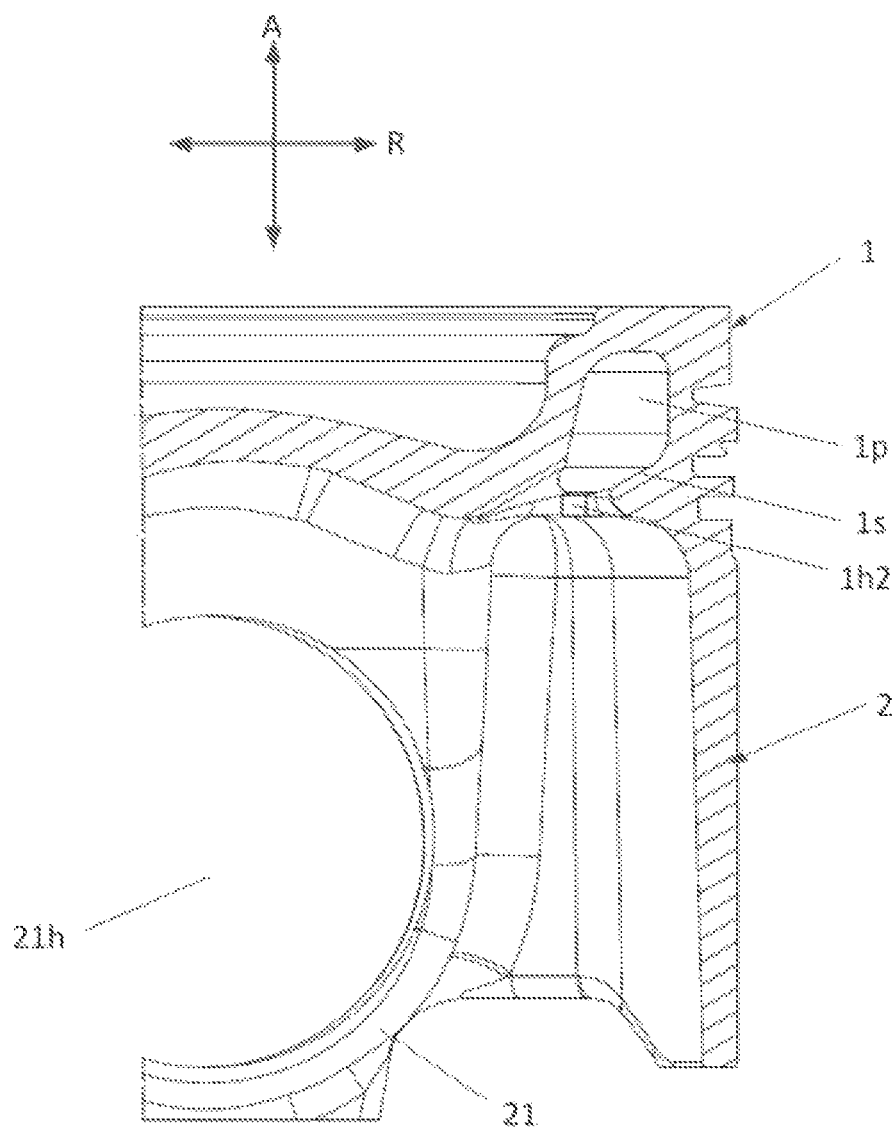
FIG. 3 is a schematic view showing a part of the cross-section of the piston in FIG. 1 taken along the axial direction.

FIGS. 1 to 3 show a piston including a lubricating mechanism according to an embodiment of the present disclosure. The piston is made of steel and formed in a substantially cylindrical shape. The piston comprises a piston top portion 1 and a piston skirt portion 2 connected thereto and extended from a peripheral portion of the piston top portion 1 to one side in the axial direction by a predetermined length. The piston skirt portion 2 is formed with two pin seat portions 21 matched with both ends of the pin, and each of the pin seat portions 21 is formed with one pin hole 21h penetrating the pin seat portion 21. The two pin holes 21h are opposite with each other and have the same central axis, which is shown as the central axis O in FIG. 2. The both ends of the pin are mounted in the pin holes 21h formed in the two pin seat portions 21, such that the pin and the pin seat portion 21 constitute a pin connection pair. Further, an intermediate portion of the pin between the both ends is connected to the connecting rod.

Hereinafter, the structure of a lubricating mechanism according to an embodiment of the present disclosure will be explained with reference to the drawings. The lubricating mechanism according to an embodiment of the present disclosure is adapted for lubricating the pin connection pair. Specifically, as shown in FIGS. 1 to 3, the lubricating mechanism comprises lubricating passage 1p though which a lubricating medium flows, and an oil inlet orifice 1h1 and oil outlet orifice 1h2 which communicate with the lubricating passage 1p and open toward one side in the axial direction.

In the embodiment, the lubricating passage 1p is formed inside the piston top portion 1 and continuously extends over the entire circumference of the piston top portion 1 along the circumferential direction C. On the one hand, the engine oil (lubricating medium) flowing in the lubricating passage 1p can be used as a cooling medium for cooling the piston of the internal combustion engine in the working state; on the other hand, the engine oil can be continuously delivered to the gap between the connecting rod and the pin seat portion 21 via the oil outlet orifice 1h2 communicating with the lubricating passage 1p, thereby the pin connection pair is lubricated.

Further, as shown in FIG. 3, the lubricating passage 1p is formed with a guiding surface 1s for guiding the engine oil toward the oil outlet orifice 1h2. The guiding surface 1s is located at a position near the bottom of the lubricating passage 1p and is formed to extend obliquely toward the other side in the axial direction while extending radially outward. The guiding surface 1s is connected to an end of the oil outlet orifice 1h2 with a larger width, such that the engine oil can be effectively guided to the oil outlet orifice 1h2, and then to the gap between the connecting rod and the pin seat portion 21 via the oil outlet orifice 1h2.

In the embodiment, there is one oil inlet orifice 1h1. The oil inlet orifice 1h1 opens to one side in the axial direction and is formed at a position of the piston top portion 1 away from the piston skirt portion 2. The nozzle (not shown) of the oil supply mechanism can continuously supply the engine oil of the internal combustion engine into the lubricating passage 1p through the oil inlet orifice 1h1.

In the embodiment, there are two oil outlet orifices 1h2. Each of the two oil outlet orifices 1h2 opens to one side in the axial direction and is formed at a position of the piston top portion 1 away from the piston skirt portion 2. The openings of the two oil outlet orifices 1h2 are opposite with the corresponding portions of the lubricating passage 1p in the axial direction A. Specifically, as shown in FIG. 3, the opening of each oil outlet orifice 1h2 is substantially located directly below the portion of the lubricating passage 1p communicating with the oil outlet orifice 1h2. The two oil outlet orifices 1h2 and the oil inlet orifice 1h1 are located on both sides of the two pin seat portions 21 with the two pin seat portions 21 therebetween, such that the engine oil supplied into the lubricating passage 1p through the oil inlet orifice 1h1 can flow a sufficient distance in the lubricating passage 1p to effectively cool the piston, and then the engine oil is discharged via the oil outlet orifice 1h2.

In a direction along the central axis O of the pin holes 21h, the two oil outlet orifices 1h2 are located between the two pin seat portions 21, and there is no overlapping portion between the two oil outlet orifices 1h2 and the two pin seat portions 21. One of the two oil outlet orifices 1h2 faces a gap between the connecting rod and one of the pin seat portions 21, and the other oil outlet orifice 1h2 faces a gap between the connecting rod and the other pin seat portion 21, such that the engine oil can directly flow to the corresponding gap by utilizing the position of the oil outlet orifice 1h2 on the piston top portion 1 and the shape characteristics of the oil outlet orifice 1h2.

With regard to the shape characteristics of each oil outlet orifice 1h2, the longitudinal direction of each oil outlet orifice 1h2 extends along a direction intersecting with the central axis O of the pin hole 21h in a plan view viewed from one side in the axial direction. Preferably, the longitudinal direction of each oil outlet orifice 1h2 extends substantially along a direction orthogonal to the central axis O of the pin hole 21h. In this longitudinal direction, the oil outlet orifice 1h2 has a tapered shape whose width gradually decreases from one end to the other end, such that the oil outlet orifice 1h2 can effectively guide the oil toward the gap. In addition, a top surface of the oil outlet orifice 1h2 extends obliquely toward one side in the axial direction while extending from one end toward the other end, thereby the engine oil effectively flows to the corresponding gap.

The specific technical solution of the present disclosure has been described in detail in the above specific embodiments. The following is a supplementary explanation of the technical solution of the present disclosure.

i. Although the above embodiments define two oil outlet orifices 1h2 and the specific structure of the oil outlet orifice 1h2 is described, the present disclosure is not limited to this. There may be one oil outlet orifice 1h2 or more than three oil outlet orifices 1h2 as required. In addition, the structure of the oil outlet orifice 1h2 is not limited to the structure described in the above embodiment, that is, any structure is acceptable as long as the structure can guide the lubricating medium to the gap between the connecting rod and the pin seat portion 21 via the oil outlet orifice 1h2.

ii. Since both the oil inlet orifice 1h1 and the oil outlet orifice 1h2 avoid the piston skirt portion 2 (especially the pin seat portion 21), the structural strength of the piston skirt portion 2 (especially the pin seat portion 21) will not be adversely affected.

iii. It is understood that since the pin connection pair and the connecting part between the connecting rod and the pin are located on both sides of the gap between the connecting rod and the pin seat portion 21 respectively, the lubricating medium guided to the gap via the oil outlet orifice 1h2 can effectively lubricate not only the pin connection pair but also the connecting part between the connecting rod and the pin.

iv. The guiding surface 1s of the lubricating passage 1p can be formed by machining, and the oil outlet orifice 1h2 can be formed by forging.

What is claimed is:

1. A lubricating mechanism of a pin connection pair of an internal combustion engine, the internal combustion engine comprising a piston, a pin, and a connecting rod, the piston having a cylindrical shape, an axial direction, a radial direction, and a circumferential direction, the piston including a piston top portion and a piston skirt portion connected to the piston top portion, the piston skirt portion extending from a peripheral portion of the piston top portion toward one side in the axial direction, the piston skirt portion having two pin seat portions matched with both ends of the pin, the both ends of the pin being mounted in a plurality of pin holes of the two pin seat portions such that the pin and one of the two pin seat portions form the pin connection pair, and an intermediate portion of the pin disposed between the both ends connected to the connecting rod, the lubricating mechanism comprising:
    a lubricating passage through which a lubricating medium is flowable, the lubricating passage formed inside the piston top portion; and
    an oil outlet orifice communicating with the lubricating passage, the oil outlet orifice disposed in the piston top portion spaced apart from the piston skirt portion;
    wherein an opening of the oil outlet orifice faces the one side in the axial direction and is disposed directly below a corresponding portion of the lubricating passage communicating with the oil outlet orifice such that the lubricating medium is flowable directly to a gap defined between the connecting rod and one of the two pin seat portions via the opening; and
    wherein, in a longitudinal direction of the oil outlet orifice, the oil outlet orifice has a tapered shape and a width that gradually decreases from one end to another end.

2. The lubricating mechanism of the pin connection pair of the internal combustion engine according to claim 1, wherein the longitudinal direction of the oil outlet orifice extends along a direction intersecting with a central axis of at least one of the plurality of pin holes in a plan view viewed from the one side in the axial direction.

3. The lubricating mechanism of the pin connection pair of the internal combustion engine according to claim 2, wherein:
the lubricating passage has a guiding surface configured to guide the lubricating medium toward the oil outlet orifice; and
the guiding surface is connected to the one end of the oil outlet orifice.

4. The lubricating mechanism of the pin connection pair of the internal combustion engine according to claim 3, wherein the guiding surface extends obliquely toward another side in the axial direction, which is opposite the one side in the axial direction, while extending radially outward.

5. The lubricating mechanism of the pin connection pair of the internal combustion engine according to claim 1, further comprising two oil outlet orifices including the oil outlet orifice; and
wherein, in a direction along a central axis of at least one of the plurality of pin holes, the two oil outlet orifices are arranged between the two pin seat portions.

6. The lubricating mechanism of the pin connection pair of the internal combustion engine according to claim 5, wherein:
a first oil outlet orifice of the two oil outlet orifices faces a first gap defined between the connecting rod and a first pin seat portion of the two pin seat portions; and
a second oil outlet orifice of the two oil outlet orifices faces a second gap defined between the connecting rod and a second pin seat portion of the two pin seat portions.

7. The lubricating mechanism of the pin connection pair of the internal combustion engine according to claim 1, further comprising an oil inlet orifice communicating with the lubricating passage, wherein the oil inlet orifice opens toward the one side in the axial direction and is disposed in the piston top portion spaced apart from the piston skirt portion.

8. The lubricating mechanism of the pin connection pair of the internal combustion engine according to claim 7, wherein the oil inlet orifice and the oil outlet orifice are arranged on opposite sides of a pin seat portion of the two pin seat portions such that the pin seat portion is disposed therebetween.

9. A piston for an internal combustion engine, comprising:
a piston top portion;
a piston skirt portion connected to the piston top portion and protruding axially from a peripheral portion of the piston top portion;
the piston skirt portion including two pin seat portions structured and arranged to receive opposite ends of a pin connected to a connecting rod such that each of the two pin seat portions and the pin form a pin connection pair;
a lubricating mechanism for the pin connection pair, the lubricating mechanism including:
a lubricating passage through which a lubricating medium is flowable, the lubricating passage disposed within and extending inside the piston top portion; and
an oil outlet orifice in fluid communication with the lubricating passage, the oil outlet orifice disposed in the piston top portion and arranged spaced apart from the piston skirt portion;
wherein the oil outlet orifice has an opening facing axially away from the piston top portion;
wherein the opening is disposed directly below a corresponding portion of the lubricating passage such that, via the opening, the lubricating medium is flowable directly to a gap that is defined between one of the two pin seat portions and the connecting rod when the pin is received in the two pin seat portions; and
wherein the oil outlet orifice is tapered such that a width of the oil outlet orifice gradually decreases from a first end to a second end.

10. The piston according to claim 9, wherein the oil outlet orifice extends longitudinally in a direction that is transverse to (i) a central axis of a pin hole of one of the two pin seat portions and (ii) an axial direction.

11. The piston according to claim 10, wherein:
the lubricating passage has a guiding surface configured to guide the lubricating medium toward the oil outlet orifice; and
the guiding surface is connected to the first end of the oil outlet orifice.

12. The piston according to claim 11, wherein the guiding surface extends obliquely toward the piston top portion in the axial direction while extending radially outward.

13. The piston according to claim 9, further comprising two oil outlet orifices including the oil outlet orifice, wherein the two oil outlet orifices are arranged between the two pin seat portions in a direction of a central axis of a pin hole of one of the two pin seat portions.

14. The piston according to claim 13, wherein:
a first oil outlet orifice of the two oil outlet orifices faces a first gap defined between a first pin seat portion of the two pin seat portions and the connecting rod when the pin is received in the first pin seat portion; and
a second oil outlet orifice of the two oil outlet orifices faces a second gap defined between a second pin seat portion of the two pin seat portions and the connecting rod when the pin is received in the second pin seat portion.

15. The piston according to claim 9, further comprising an oil inlet orifice in fluid communication with the lubricating passage, wherein:
the oil inlet orifice is disposed in the piston top portion spaced apart from the piston skirt portion; and
the oil inlet orifice has an opening facing axially away from the piston top portion.

16. The piston according to claim 15, wherein the oil inlet orifice and the oil outlet orifice are arranged on opposite sides of the two pin seat portions such that the two pin seat portions are disposed therebetween.

17. The piston according to claim 9, further comprising a plurality of ring grooves, wherein the oil outlet orifice is disposed radially adjacent to at least one of the plurality of ring grooves.

18. The piston according to claim 17, wherein:
the plurality of ring grooves incudes (i) an uppermost ring groove disposed furthest from the two pin seat portions and (ii) a lowermost ring groove disposed closest to the two pin seat portions; and
the oil outlet orifice is arranged at least partially between the uppermost ring groove and the lowermost ring groove relative to an axial direction.

19. A piston for an internal combustion engine, comprising:
a piston top portion;
a piston skirt portion connected to the piston top portion and protruding axially from a peripheral portion of the piston top portion;

the piston skirt portion including two pin seat portions structured and arranged to receive opposite ends of a pin connected to a connecting rod such that each of the two pin seat portions and the pin form a pin connection pair;

a lubricating mechanism for the pin connection pair, the lubricating mechanism including:

a lubricating passage through which a lubricating medium is flowable, the lubricating passage disposed within and extending inside the piston top portion; and an oil outlet orifice in fluid communication with the lubricating passage, the oil outlet orifice disposed in the piston top portion and arranged spaced apart from the piston skirt portion;

wherein the oil outlet orifice has an opening facing axially away from the piston top portion;

wherein the opening is disposed directly below a corresponding portion of the lubricating passage such that, via the opening, the lubricating medium is flowable directly to a gap that is defined between one of the two pin seat portions and the connecting rod when the pin is received in the two pin seat portions;

wherein the oil outlet orifice extends longitudinally in a direction that, in an axially viewed plan view, is transverse to a central axis of a pin hole of one of the two pin seat portions; and wherein, in a longitudinal direction of the oil outlet orifice, the oil outlet orifice has a tapered shape and a width that gradually decreases from one end to another end.

* * * * *